United States Patent [19]

Freud et al.

[11] Patent Number: 4,787,786

[45] Date of Patent: Nov. 29, 1988

[54] LAMINATE CUTTING DEVICE

[76] Inventors: Ivan B. Freud, 21 Lamb La., Manalapan, N.J. 08049; Alan Melcer, 308 Kase Rd., Lakewood, N.J. 08701

[21] Appl. No.: 88,709

[22] Filed: Aug. 24, 1987

[51] Int. Cl.[4] ............................................. B27C 5/00
[52] U.S. Cl. ................................ 409/180; 409/178; 409/237
[58] Field of Search ................... 409/175, 178–180, 409/237, 97, 110; 144/134 R, 136 R, 144 R

[56] References Cited

U.S. PATENT DOCUMENTS

| | | | |
|---|---|---|---|
| 2,696,763 | 12/1954 | Daugherty et al. | 409/237 |
| 2,983,199 | 5/1961 | Daugherty | 409/237 |
| 3,289,717 | 12/1966 | Dutot | 144/134 |
| 3,684,395 | 8/1972 | Nurakami | 409/237 |
| 3,880,048 | 4/1975 | Zimmerman | 409/97 |

Primary Examiner—John McQuade
Attorney, Agent, or Firm—Martha A. Michaels

[57] ABSTRACT

The present invention relates to a cutting device suitable for cutting one part of a laminate to conform its shape to the other part of the laminate. The device comprises a vertical motion means mounted on a horizontal motion means, the vertical motion means having a rotating cutting blade mounted thereon. The cutting device is able to conform a veneer to the exact shape of a subsurface base within 0.001 inch.

5 Claims, 2 Drawing Sheets

LAMINATE CUTTING DEVICE

The present invention relates to a cutting device particularly suitable for cutting laminates. The device includes a vertical track mounted over a horizontal track so that the vertical track moves horizontally over the horizontal track, a cutting device mounted so as to travel vertically over the vertical track and a counter balance mounted on the reverse side of the vertical track to counter the weight of the cutting device. The laminate cutting device of the present invention can cut the excess material from a veneer in any configuration encompassing 360 degrees following the configuration of the underlying subsurface with an accuracy of 0.001 inch.

BACKGROUND INFORMATION

When manufacturing wood products, such as kitchen cabinets, furniture and the like, it is frequently necessary to laminate a thin veneer to the wood, or underlying subsurface base material such as compressed board or the like. It has been found preferable to cut the base material to the desired shape and then apply the veneer. The veneer is subsequently shaped or cut to the exact configuration of the underlying subsurface. If one attempts to cut the subsurface and veneer at the same time, the veneer frequently chips along the edge. Therefore these steps are necessary to prevent the splitting and chipping of the veneer from the subsurface along the edge being cut.

The art has provided expensive machinery to attempt to cut the veneer along the edge of the subsurface material so that the veneer and the subsurface material have a common smooth edge. To date, the machines developed have required more than one cutting blade or knife to cut the veneer in the configuration of the subsurface material when the subsurface material is not simply a straight surface. For instance, the door of a kitchen cabinet is rounded on the end. When cutting the veneer adhered to the side of the door, it is necessary to be able to cut the veneer in the exact round shape of the door's end. None of the prior art machines have provided a subsequent cut of veneer within 0.001 inch of the configuration of the subsurface material.

Furthermore, prior machines can cut only a predetermined radius and hence are not able to cut random configurations as required on many product base materials. These machines are limited to specific lengths and predetermined configurations. Such limitations have either required large expensive machinery which only partially overcomes the problems of cutting fast and accurately, or cutting by hand, which though frequently is more accurate, requires particular skills and hence is costly.

SUMMARY OF THE INVENTION

The present invention provides an apparatus for cutting one part of a laminate to conform its shape to the underlying subsurface. The apparatus has a means for moving a rotating cutting blade horizontally in cooperation with means for moving the blade vertically. The vertical and horizontal motions are in a single plane. The cutting blade means is preferably a router outfitted with a bearing router bit with a depth guide. The means for moving the blade means either vertically or horizontally are comprised of dual shaft rail systems with a carriage mounted on bearings fitted on the dual rails. The single dual shaft rail system is comprised of two shafts mounted in perfect alignment on a U-shaped aluminum base. The carriage assembly is a pillow block with bearings inside.

In the construction of the apparatus of the present invention two U-shaped dual shaft rail systems (dsrs) are attached to each other at the base or underside of the U, each dsrs having a carriage mounted thereon which carriage will travel substantially the length of the rails. The cutting blade is mounted on one carriage and a weight to counterbalance the weight of the cutting blade means is mounted on the other carriage. These two attached dsrs comprise the vertical motion means of the apparatus. The two carriages on opposite sides of the vertical motion means are connected by a cable extending over the uppermost portion of the vertical motion means through at least one pulley. The length of the cable is equal to at least the length of the vertical motion means and preferably substantially equal to the length of one of the vertical rail systems. Thus when the cutting blade is moved upward or downward the counterbalance weight moves in the opposite direction.

The horizontal motion means is a dsrs with a carriage to which the vertical motion means is attached. Thus the cutting blade can be moved upward, downward, forward and backward in the same plane. The depth guide on the cutting blade follows the contour of the subsurface allowing the cutting of the veneer to the exact shape of the underlying subsurface.

DETAILED DESCRIPTION OF THE INVENTION

Figure 1:
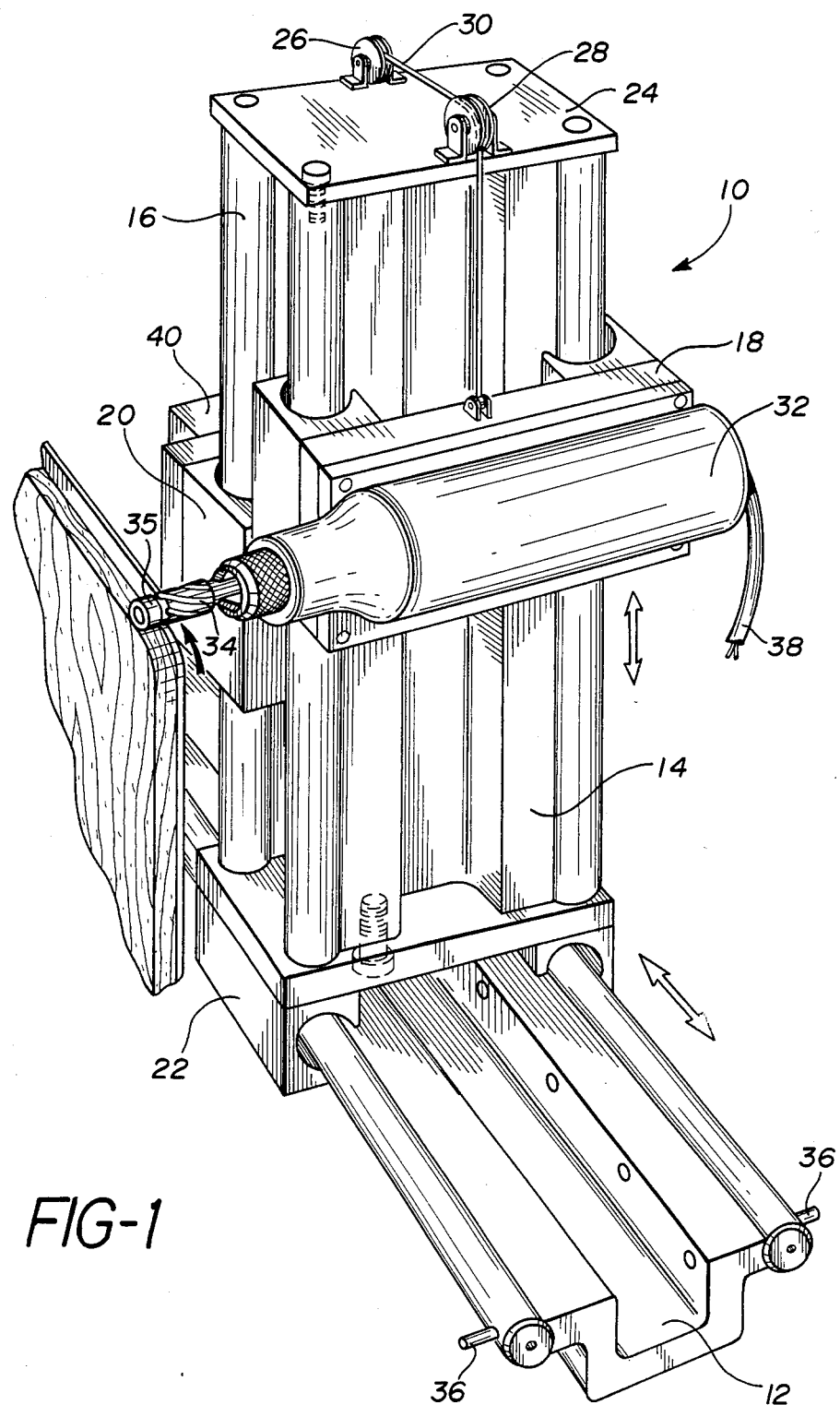
FIG. 1 is a perspective view of one embodiment of the present invention.

Referring now to FIG. 1, a cutting device 10 is provided having a dual shaft rail system 12 in a horizontal position. Mounted on the dsrs 12 is a carriage 22 which is a pillow block with bearings inside allowing the carriage to move smoothly over the length of the rails of the dsrs. Mounted vertically on the carriage 22 is the vertical motion means 15. The vertical motion means 15 is comprised of back-to-back dual shaft rail systems 14 and 16. The dsrs 14 and 16 are attached to each other at the underside of each dsrs so that their respective carriages 18 and 20 each can travel the length of its respective rails. The dsrs 14 and 16 fastened together at their bases, i.e. at the bottom of the U of each dsrs, form the vertical motion means 15. The vertical motion means 15 is securely mounted vertically on the carriage 22 of the horizontal dsrs 12. At the top of the device 10 is a joining plate 24 which assures the stability of the joined vertical dsrs 14 and 16.

Secured to the joining plate are two pulleys 26 and 28. The pulleys 26 and 28 are centered on each side of the joining plate 24. A cable 30 extends from one carriage 18 of the vertical motion means 15 upward through one pulley 28, across to the other pulley 26 and downwardly to the other carriage 20. The cable 30 is attached to each carriage approximately in the center of the carriage's side which faces upward. Thus the cable 30 extends from one carriage 18 of the vertical motion means 15 up over the top of the vertical motion means 15 and down to the second carriage 20 of the vertical motion means 15. The length of the cable 30 is approximately equal to the length of the vertical motion means. Thus when the carriage 18 is moved in one direction, the carriage 20 moves the same distance in the opposite direction.

The cutting instrument 32, generally in the form of a router, is mounted on the carriage 18. A counterbalance 40 having a weight appproximately equal to that of the cutting instrument 32 is mounted on the carriage 20. If the cutting instrument 32 is a router, it is mounted on the carriage 18 in such a manner that its blade 34 is horizontal and extends beyond the carriages 18 and 20. At the tip of the blade 34 is a depth guide 35. The depth guide 35 is selected so that the cutting blade 34 cuts precisely the depth desired.

The counterbalance system makes it easy to move the cutting instrument 32 up and down. Similarly, the cutting instrument 32 or router is easily moved forward and backward as the vertical motion means mounted on the carriage 12 easily moves forward and backward. On the base dsrs 12 there are stops 36 placed on each rail so as to prevent the vertical motion means from running off the end of the rails of the dsrs 12. Stops 36 are similarly placed at the rear of the dsrs 12, as shown in the top plan view of FIG. 2. Power is supplied to the cutting instrument 32 from a power source 38.

Figure 2:
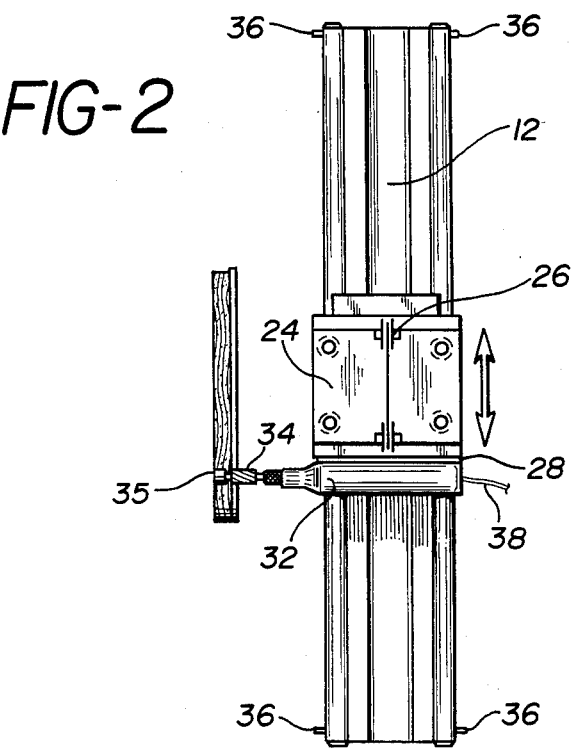
FIG. 2 is a to plan view of the embodiment of FIG. 1.

FIG. 2 is a top plan view of the cutting device 10 of FIG. 1. It depicts the ability of the device to move backward and forward as signified by the arrow. The cutting blade 34 is cutting the veneer horizontally, hence the router 32 is stationary as to its position on the vertical motion means, but it is moving backward and forward on the rails of the dual shaft rail system 12.

Figure 3:
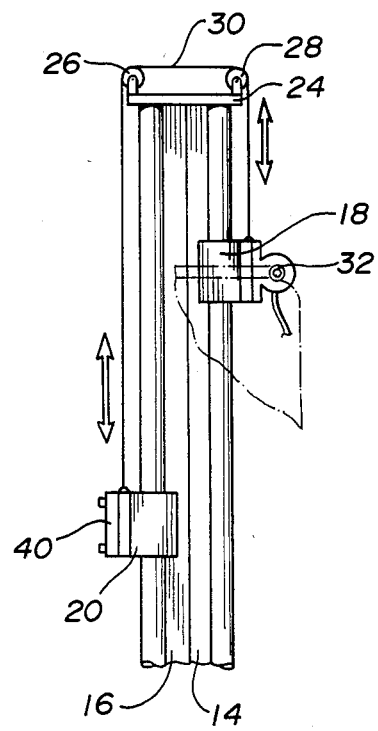
FIG. 3 is a side elevational view of the embodiment of FIG. 1.

FIG. 3 is a partial side elevational view of the device 10 of FIG. 1. The arrows show the ascending and descending movements of the cutting instrument 32 and its counterbalance 40 on their respective carriages 18 and 20. The position of the cutting instrument 32 shows that the veneer has been cut on the vertical side and on the arc to the top horizontal surface. To continue cutting, the vertical motion means 15 comprised of dsrs 14 and 16 is moving to the left in FIG. 3.

The cutting device of the present invention is unique in is ability to move both vertically and horizontally simultaneously while maintaining the accuracy of the cutting of one part of a laminate to match within 0.001 inch of another part of the laminate, regardless of the shape or contour. This stability of the motion of the cutting blade is provided by cooperation of the horizontal motion means and the vertical motion means. These motion means are comprised of dual shaft rail systems having mounted thereon carriages which are comprised of pillow blocks riding on the rails on bearings provided inside the pillow blocks. The dual shaft rail systems are comprised of U-shaped aluminum bases with hardened and ground shafts to provide rails mounted in perfect alignment along the upper side edges of the base. The combination of the horizontal and vertical motions occurring simultaneously permits the shaping of the outer layer veneer laminated on a subsurface to any shape within 360 degrees. For example, if a circular subsurface has a roughed out veneer laminated to the true circular subsurface, the cutting device of the present invention will shape the veneer edge to match that of the circular subsurface within 0.001 inch of the edge of the subsurface. By extending the length of the rails on either or both of the horizontal motion means and the vertical motion means, the cutting device can be adapted to cut along any desired length of material.

The cutting instrument can be any instrument suitable for cutting the outer layer of a laminate to match closely the shape of the subsurface of the laminate. At present the most satisfactory instrument discovered is a router with a bearing router bit having a depth guide. The whirling blade cuts the outer layer veneer while the depth guide follows the shape of the subsurface base.

The counterbalance is any suitable weight substantially equal in weight to the cutting instrument. The counterbalance is mounted on the carriage on the opposite side of the vertical motion means from the carriage to which the cutting device is secured. The complementary weights permit the cutting device to move easily whether descending or ascending. Furthermore, the counterbalance helps to easily maintain the cutting device at a desired level when cutting horizontally.

The size of the cutting blade is dependent on the thickness of the outer layer portion of the laminate to be cut. Thus substantially any thickness can be cut so as to conform precisely to the shape of another portion of a laminate.

The foregoing description and the drawings are illustrative and are not to be taken as limiting. Still other modifications and variations are possible without departing from the spirit and scope of the present invention.

We claim:

1. A laminate cutting device comprising a horizontal motion means having a dual shaft rail system with a first carriage mounted thereon said carriage being moveable from one end of said rail system to the other end of said rail system; a vertical motion means comprising a pair of U-shaped dual shaft rail systems each having a carriage mounted thereon said pair of dual shaft rail systems being attached base to base and mounted vertically on said first carriage, each vertical carriage being moveable vertically to ascend or descend from substantially one end of its rail system to substantially the other end of its rail system; a cable connecting the carriages of the vertical dual shaft rail systems which cable extends over the uppermost portion of said vertical motion means through at least one pulley; a cutting blade comprised of a router having a bearing router bit with a depth guide said router being mounted on one of said vertical dual shaft rail system carriages and a counterbalance weight mounted on the other of said vertical dual shaft rail system carriages.

2. The device of claim 1 wherein the length of said cable is substantially equal to the length of one of the vertical dual shaft rail systems.

3. An apparatus for cutting one part of a laminate to conform its shape to another part of the laminate, said apparatus comprising means for moving a rotating cutting blade vertically, and means for moving said rotating cutting blade horizontally, said vertical motion means comprising two U-shaped vertical dual shaft rail systems attached to each other at the base of the U, each dual shaft rail system having a carriage mounted thereon, each carriage being moveable substantially from one end of its rail system to substantially the other end of its rail system, said cutting blade being mounted on one carriage and a counterbalance being mounted on said other carriage, and means for the said carriages of said vertical motion means to ascend and descend their respective vertical dual shaft rail systems reciprocally, said vertical motion means moving vertically in cooperation with said horizontal motion means to provide vertical motion and horizontal motion simultaneously of said cutting blade in a single plane.

4. The apparatus of claim 3 wherein said horizontal motion means is comprised of a dual shaft rail system having a carriage mounted thereon which carriage is moveable from substantially one end of said dual shaft rail system to substantially the other end of said dual shaft rail system.

5. The apparatus of claim 3 wherein said means for said carriages to ascend and descend their respective vertical dual shaft rail systems is comprised of a cable connecting said carriages and extending over the uppermost portion of said vertical motion means through at least one pulley.

* * * * *